US010638727B1

(12) United States Patent
Maher (10) Patent No.: US 10,638,727 B1
(45) Date of Patent: May 5, 2020

(54) BIRD BATH ASSEMBLY HAVING A BALLAST-FILLABLE BASE (71) Applicant: Michael B. Maher, Wilton Manors, FL (US)

(72) Inventor: Michael B. Maher, Wilton Manors, FL (US)

( * ) Notice: Subject to any disclaimer, the term of this patent is extended or adjusted under 35 U.S.C. 154(b) by 0 days.

(21) Appl. No.: 16/506,274

(22) Filed: Jul. 9, 2019

(51) Int. Cl.
*A01K 7/00* (2006.01)
*A01K 45/00* (2006.01)

(52) U.S. Cl.
CPC ................ *A01K 45/002* (2013.01)

(58) Field of Classification Search
CPC .................................. A01K 45/002
USPC ........................................ 119/69.5
See application file for complete search history.

(56) References Cited

U.S. PATENT DOCUMENTS

| 151,003 | A | * | 5/1874 | Briesen | B05B 17/08 239/22 |
|---|---|---|---|---|---|
| 1,895,702 | A | * | 1/1933 | Burley | A01K 45/002 119/69.5 |
| 1,962,840 | A | | 6/1934 | Rives | |
| 2,002,378 | A | * | 5/1935 | Richardson | A01K 45/002 119/69.5 |
| 2,838,351 | A | * | 6/1958 | Siconolfi | A47B 37/04 108/25 |
| 2,878,781 | A | * | 3/1959 | Wingfield | A01K 45/002 119/72 |
| 3,084,666 | A | | 4/1963 | Plaisance | |
| 3,231,229 | A | * | 1/1966 | Morella | E04H 13/003 248/158 |
| 3,648,659 | A | * | 3/1972 | Jones | A01K 39/02 119/69.5 |
| 5,195,463 | A | | 3/1993 | Lorenzana | |
| 5,784,998 | A | * | 7/1998 | Manzer | A01K 45/002 119/69.5 |
| 6,079,951 | A | | 6/2000 | Morton | |
| 6,484,666 | B1 | | 11/2002 | Reusche | |
| 6,520,606 | B1 | * | 2/2003 | Robinson | A61G 17/08 27/1 |
| 6,634,316 | B2 | | 10/2003 | Desatoff | |
| 6,684,813 | B1 | | 2/2004 | Lemon | |
| 7,891,319 | B2 | | 2/2011 | Stone et al. | |
| 8,210,447 | B2 | | 7/2012 | Cohen | |
| 8,251,015 | B2 | | 8/2012 | Potter | |
| 2003/0075113 | A1 | * | 4/2003 | Desatoff | A01K 45/002 119/69.5 |

(Continued)

FOREIGN PATENT DOCUMENTS

WO  WO-9739617 A1 * 10/1997 ............... A01G 9/02

*Primary Examiner* — Claude J Brown
(74) *Attorney, Agent, or Firm* — Glenn E. Gold, P.A.; Glenn E. Gold (57) ABSTRACT

A bird bath includes a base and a removable basin mounted to the base. The base includes a hollow interior space that accommodates ballast material. A threaded joint facilitates a removable connection between the basin and base. The base is configured with one of a threaded male and female fastener formation at its upper end, while the basin is configured with the other of the threaded male and female fastener formation at its lower end. A threaded engagement between the male and female fastener formations is effective in mounting the basin to the base. A removable plug insert can be used to isolate the basin reservoir from the ballast-receiving interior space of the base.

13 Claims, 10 Drawing Sheets

(56) References Cited

U.S. PATENT DOCUMENTS

| | | | |
|---|---|---|---|
| 2003/0101942 A1* | 6/2003 | Reusche | A01K 45/002 119/69.5 |
| 2005/0145184 A1 | 7/2005 | Fort, II | |
| 2006/0169213 A1* | 8/2006 | Montie | A01K 45/002 119/69.5 |
| 2007/0028846 A1* | 2/2007 | Cohen | B05B 17/08 119/69.5 |
| 2009/0159008 A1* | 6/2009 | Humphries | A01K 39/0206 119/51.5 |
| 2009/0159261 A1 | 6/2009 | Lira et al. | |
| 2009/0277392 A1* | 11/2009 | Potter | A01K 45/002 119/69.5 |
| 2009/0288607 A1* | 11/2009 | Held | A01K 39/0113 119/52.1 |
| 2010/0089332 A1* | 4/2010 | Dye, Jr. | A01K 45/002 119/69.5 |
| 2017/0089509 A1* | 3/2017 | Bailey | F16B 7/182 |

* cited by examiner

BIRD BATH ASSEMBLY HAVING A BALLAST-FILLABLE BASE

FIELD OF THE INVENTION

The present invention relates generally to bird bath constructions, and, more particularly, to the design of bird bath units that promote stability by using a base that is fillable with a ballast.

BACKGROUND OF THE INVENTION

Bird baths are used to attract birds and other small animals to visible locations, usually in the yards of home owners in order that the home owners and guests may enjoy the presence of such wildlife. Providing a bird bath with fresh water is a proven way to attract birds and cater to their love of bathing. Ground-supported bird baths are commonly constructed from concrete or other heavy materials in order to provide stability (i.e., to prevent the birdbath from falling over and potentially injuring someone; particularly, young children who may pull on or hang from the bird bath unaware of the inherent risk of injury).

Conventionally, ground-supported bird baths have a water-fillable upper basin supported by a heavy lower base portion. It is very important that the basin is cleaned regularly. Even the best designed bird bath can be a hazard to birds in several ways. For example, water contaminated with feces, rotting debris, and mold is a breeding ground for harmful bacteria that can spread diseases to any bird that takes a drink. Even if one sick bird sips from the bath, the water can be contaminated and dangerous to other birds. Additionally, stagnant water harbors insects that can transmit diseases between birds or even to other wildlife, pets, and humans. The base portions are typically solid constructions, but even in those base structures that are not completely solid the overall weight of the bird bath makes it difficult to remove water from the basin. Removing water in order to clean the basin is a tedious chore requiring the user to tip the bird bath over to pour out water from the basin, a task made difficult by the bulkiness and weight of the bird bath, especially one having a solid or semi-solid base.

Moreover, due to the heavy weight of most ground-supported bird baths, the packaging, shipping, and transporting of such goods are difficult and expensive. This complexity is a primary reason that many people do not purchase bird baths in the first place.

Accordingly, there is a long-felt, but as-of-yet unmet, need for a bird bath design that features adjustable stability, modularity, portability, and ease of assembly and disassembly.

SUMMARY OF THE INVENTION

The present invention is directed to a bird bath unit including a base and a basin. The base includes an interior compartment space capable of holding fluid or other suitable material to serve as stabilizing ballast.

In one exemplary implementation, the bird bath may include:
a base having a ballast-receiving interior space; and
a basin removably mounted to the base and defining a fluid receptacle space isolated from the ballast-receiving interior space of the base.

In another exemplary implementation, the bird bath may include:

a base having a ballast-receiving interior space, the base further having an opening defined at an upper end of the base and disposed in communication with the ballast-receiving interior space;
a male fastener sleeve disposed at the upper end of the base and having an interior bore space disposed in communication with the opening of the base, the male fastener sleeve including external threads provided on an exterior surface thereof and internal threads provided on an interior surface thereof;
a basin removably mounted to the base and defining a fluid receptacle space;
an aperture formed in a lower portion of the basin and disposed in communication with the fluid receptacle space of the basin, the basin aperture including internal threads;
a joint defined by an adjustable threading engagement between the male fastener sleeve at the external threads thereof and the basin aperture at the internal threads thereof;
a selectively removable plug having external threads; and
a sealing formation defined by an adjustable threading engagement between the plug at the external threads thereof and the male fastener sleeve at the internal threads thereof.

In yet another exemplary implementation, the bird bath may include:
a unitary bird bath structure including
a base having a ballast-receiving interior space;
a basin integral with the base and defining a fluid receptacle space; and
a fluid port connecting the fluid receptacle space of the basin and the ballast-receiving interior space of the base.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF PREFERRED IMPLEMENTATIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now generally to accompanying FIGS. 1 through 4a, a bird bath is generally shown at 100, according to a first embodiment of the present invention. The bird bath 100 includes, in combination, a base shown generally at 102 and a basin shown generally at 104. The basin 104 is removably mounted to base 102, making bird bath 100 an assembled two-piece construction. The base 102 forms the lower part of bird bath 100, while basin 104 forms the upper removable part of bird bath 100.

Figure 1:
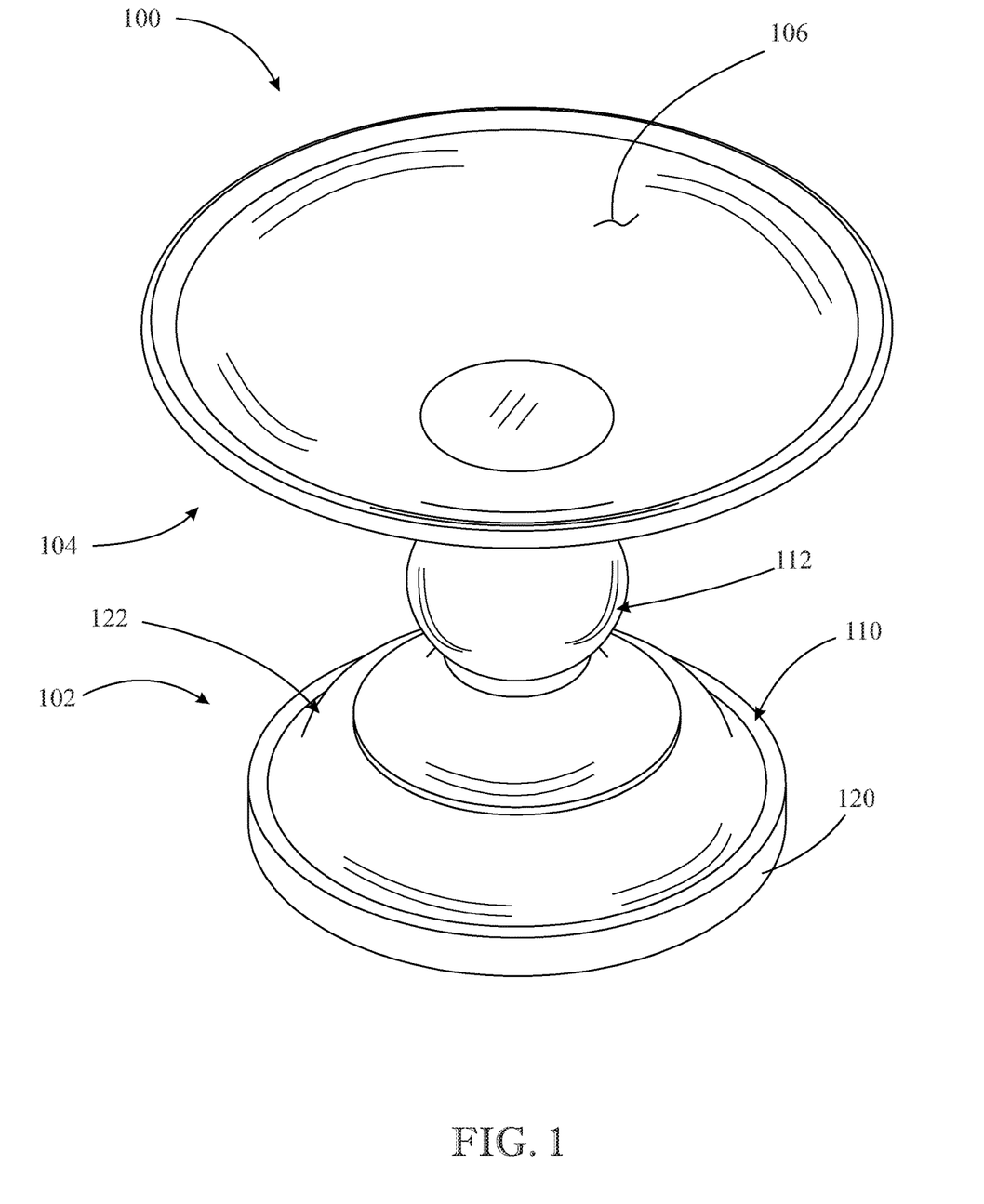
FIG. 1 presents a top front perspective view of an assembled bird bath, according to a first exemplary implementation of the present invention.
Figure 2:
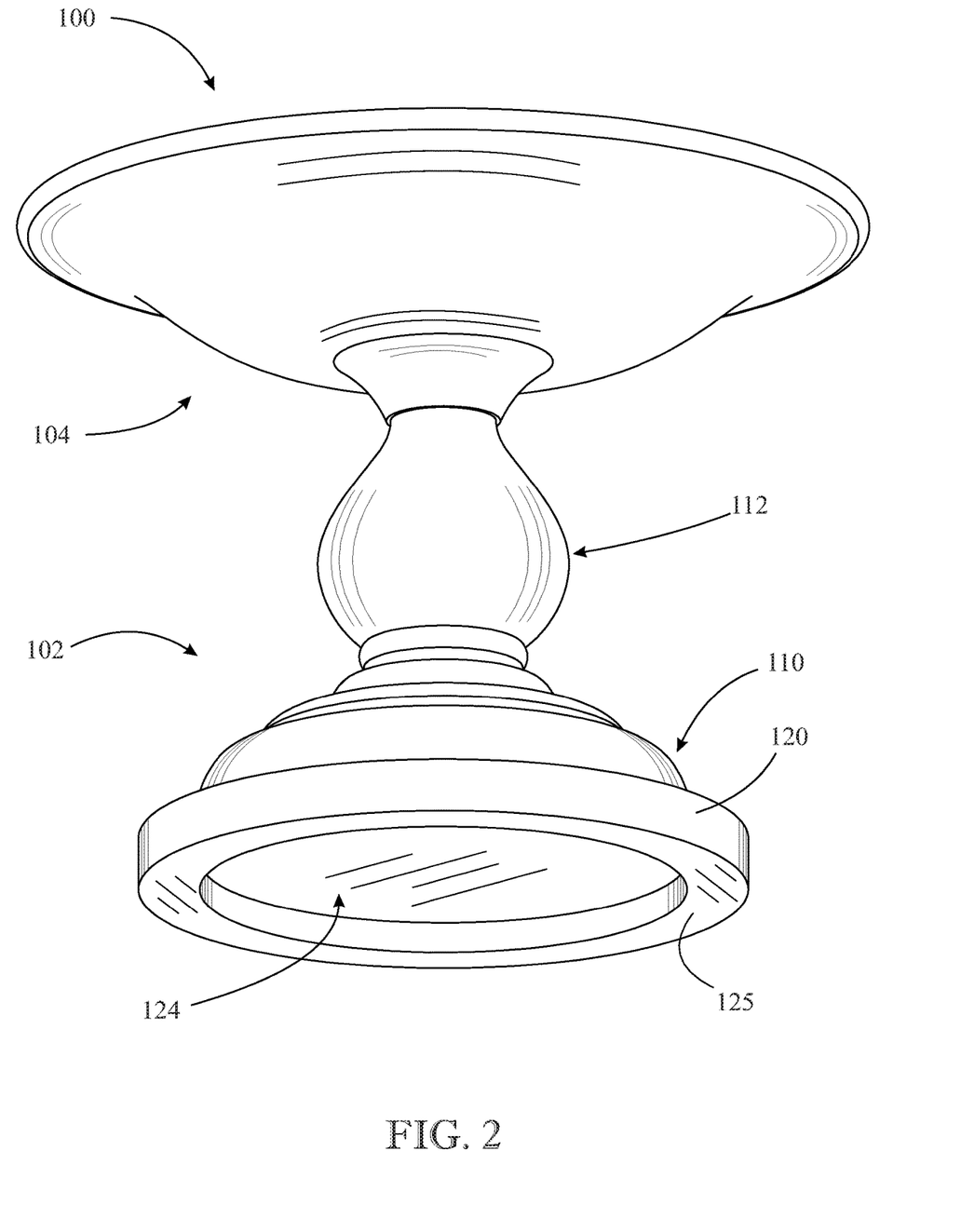
FIG. 2 presents a bottom front perspective view of the bird bath originally introduced in FIG. 1.
Figures 4, 4A:
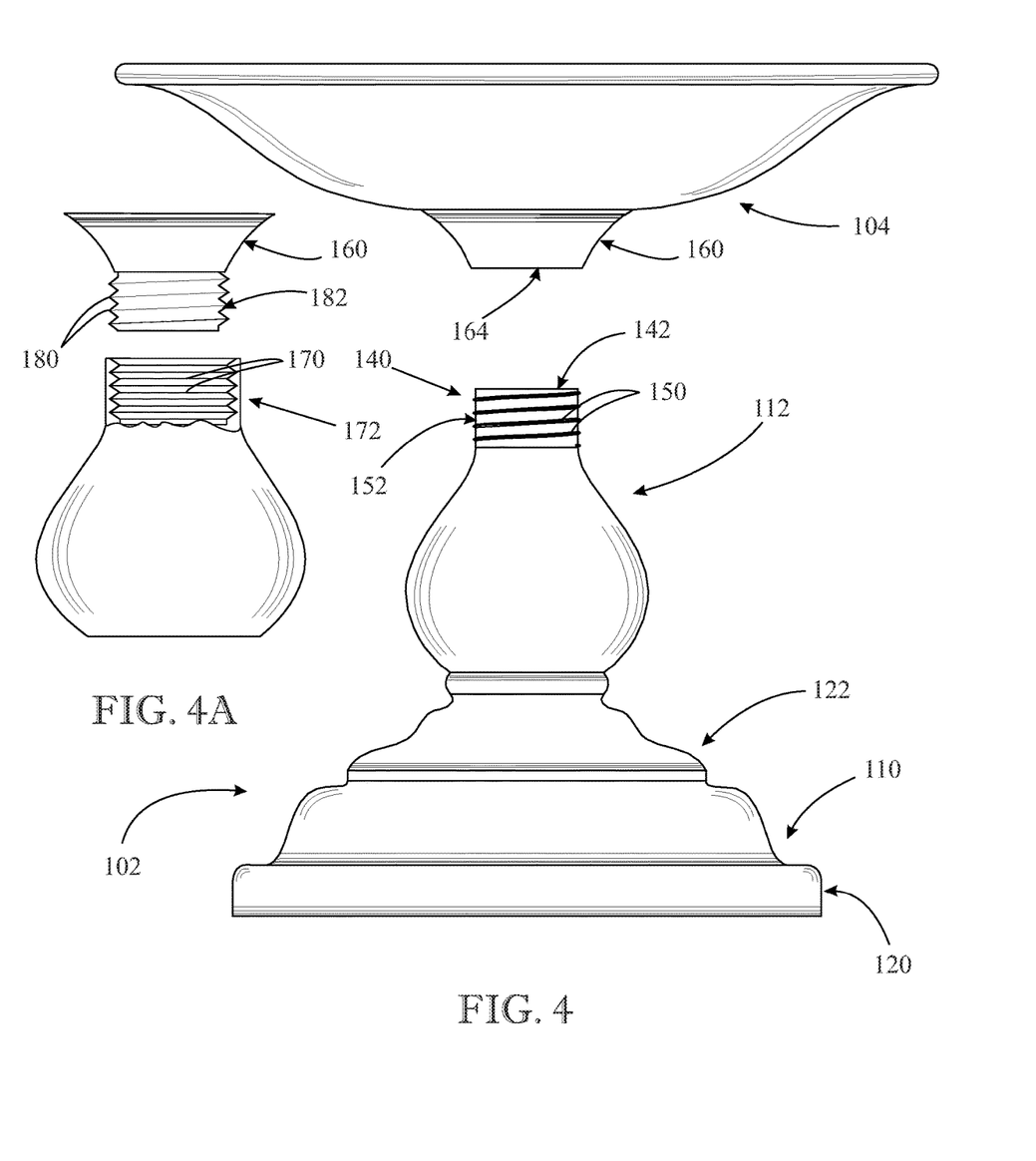
FIG. 4 presents a front exploded elevation view of the bird bath originally introduced in FIG. 1 and further depicted in FIG. 3A, showing the basin removed from its mounting relationship to the base to illustrate the external threads of the male portion integral with the base.
FIG. 4A presents a partial sectional view of the lower portion of the basin and the upper portion of the base of the bird bath originally introduced in FIG. 1, illustrating an alternative type of connection to removably attach the basin to the base, which involves a threading engagement between a male fastener integral with the basin and a female fastener integral with the base, as shown in a partially broken away form to expose female fastener internal threads.

Referring particularly to FIGS. 1 and 4, the base 102 has a lower pedestal structure shown generally at 110 and an upper neck or mounting portion shown generally at 112 that extends upwardly from pedestal 110. Base 102 is preferably a one-piece construction. The pedestal 110 of base 102 has a generally circular bottom end 120 and an intermediate portion shown generally at 122 connecting the bottom end 120 to neck 112. The bottom end 120 serves as the location for contacting the ground surface when bird bath 100 is installed. Bottom end 120 may incorporate a cavity 124 formed at its underside—and further defining an annular peripheral wall portion 125—to accommodate objects, such as grass, rocks, and uneven earth, when bird bath 100 is situated on the ground (FIG. 2). In one form, pedestal 110 has a progressively narrowing, reduced diameter profile extending in the direction from bottom end 120. The basin 104 has a conventional form including a depression, cavity or generally concave-shaped surface 106. The surface 106 defines a fluid receptacle space that receives and holds water during use.

Figure 3:
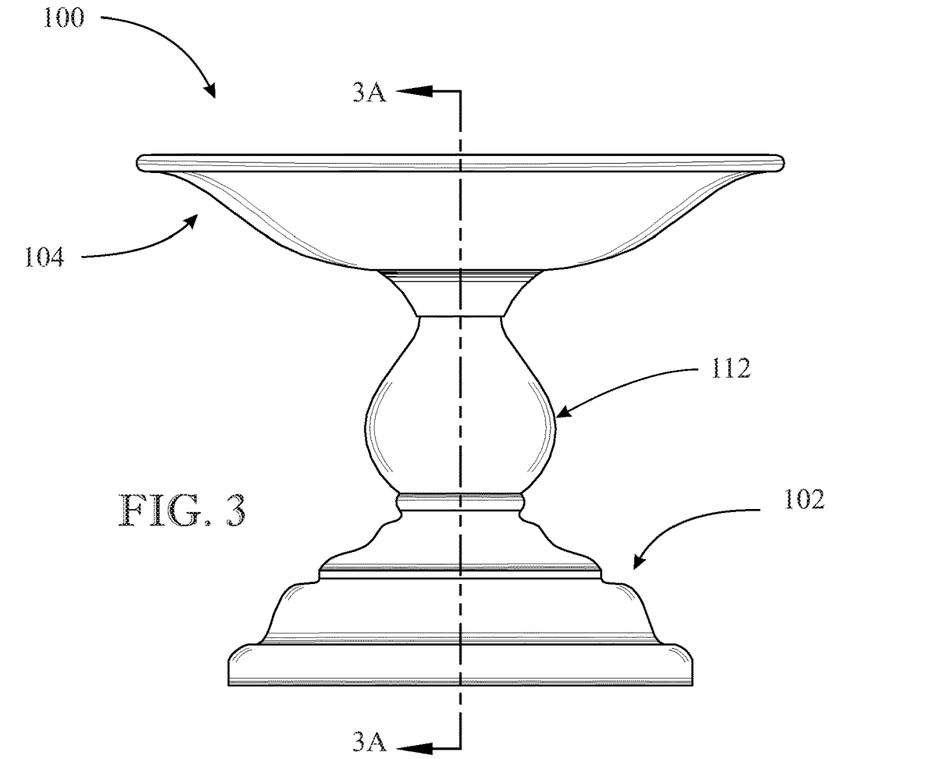
FIG. 3 presents a front elevation view of the bird bath originally introduced in FIG. 1.
Figure 3A:
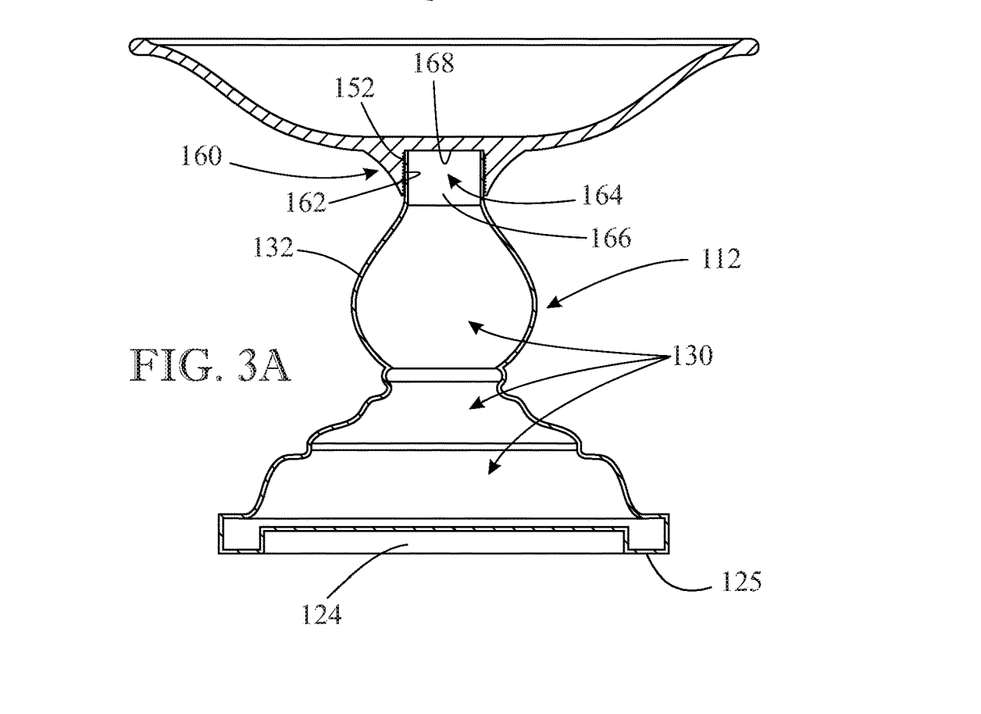
FIG. 3A presents a cross-sectional view taken along section line 3A-3A of FIG. 3, illustrating one type of connection to removably attach the basin to the base of the bird bath, which involves a threading engagement between a male connecting portion integral with the base and a female connecting portion integral with the basin.

Referring to FIG. 3A, base 102 has a hollow interior space generally shown at 130 that functions as a compartment to receive ballast material such as water. The ballast-receiving interior space 130 of base 102 can be designed in any suitable manner. For example, the entirety of base 102 can be hollowed out, making the whole interior available to receive ballast material. In such a construction, the ballast-receiving interior space 130 of base 102 would be circumscribed by the entire outer peripheral surface 132 of base 102 (FIG. 3A). Alternatively, a portion or section of the interior of base 102 can be hollowed out.

For purposes of accessing the ballast-receiving interior space 130, the upper end 140 of base 102 (proximal neck 112) is formed at its terminus with an orifice or open-ended mouth section 142 defining a hole or fluid port that is arranged in communication with the ballast-receiving interior space 130. The mouth section 142 enables access to the ballast-receiving interior space 130 of base 102. In this manner, mouth section 142 functions as an inlet port through which the interior space 130 of base 102 can be filled with ballast material (such as by admitting water), and functions as an outlet port through which the ballast material held in base 102 can be removed or discharged (drained out) in order to empty base 102 of its ballast contents.

The basin 104 is removably mounted to base 102. In particular, base 102 and basin 104 are joined together using a selectively adjustable threaded connection. Referring to FIG. 4, in one form, the base 102 provides the male fitting and the basin 104 provides the complementary, mateable female fitting. In particular, in base 102, the upper end 140 has a set of external threads generally indicated at 150 to define an externally-threaded cylindrical male portion 152 that functions as a male fastener or fitting. The externally-threaded male portion 152 preferably defines the uppermost portion of base 102. In basin 104, the counterpart female fitting is provided in a flange section 160 centrally disposed at an underside of basin 104 in facing opposition to base 102. The flange section 160 is integral with basin 104 and can be provided in any suitable form. The flange section 160 preferably defines the lowermost portion of basin 104. Referring to FIGS. 3A and 4, flange section 160 has an open end 166, or upper opening, configured with a set of internal threads shown generally at 162 to define an internally-threaded cylindrical female portion 164 that functions as a female fastener or fitting. The externally-threaded male portion 152 formed in base 102 and the internally-threaded female portion 164 formed in the basin 104 are complementary and mateable with one another, facilitating a cooperative threading engagement therebetween. The upper opening 166, in the form of a cavity, includes a closed bottom end, shown generally at 168, to define a closed terminus of cavity 166 opposite the open end of cavity 166.

Prior to assembly, when basin 104 is removed from base 102, the user locates base 102 in its installation location. The user then fills base 102 with a desired amount of ballast material by supplying or admitting such ballast material into the ballast-receiving interior space 130 of base 102 via mouth opening 142. In a preferred form, the ballast material is a fluid such as water. The user then positions basin 104 over base 102, joining these parts together by screwing the basin 104 onto base 102. In particular, basin 104 is maneuvered into position over base 102 so that the internally-threaded female portion 164 formed at the lower end of basin 104 is aligned in axial registration with the externally-threaded male portion 152 formed at the upper end of base 102. A subsequent threading engagement between the internally-threaded female portion 164 and the externally-threaded male portion 152 forms a secure threaded connection or attachment between basin 104 and base 102. This threaded connection positions basin 104 into a selectively removable mounting or support relationship with base 102. The basin 104 can be removed from base 102 by simply reversing the threaded connection in an unscrewing operation.

Referring to FIG. 3A, the cavity 166 defined in flange 160 at the bottom end of basin 104 effectively functions as a cap to close off, plug, or otherwise cover the ballast-receiving interior space 130 of base 102, once basin 104 is screwed onto base 102. In particular, when the internally-threaded female portion 164 formed at the lower end of basin 104 is screwed onto the externally-threaded male portion 152 formed at the upper end of base 102, the bottom end 168 of cavity 166 fully covers the mouth opening 142 formed at the upper end 140 of base 102, thereby sealing shut the ballast-receiving interior space 130 of base 102 and forming a closed containment space for holding the ballast material.

Referring to FIG. 4A, an alternate joint arrangement to that shown in FIG. 4 can be used to attach the basin 104 to base 102, which involves reversing the location of the male and female fasteners. In this alternative arrangement, the base 102 provides the female fastener and the basin 104 provides the complementary, mateable male fastener. In particular, in base 102, the upper end 140 has a set of internal threads generally indicated at 170, formed proximate mouth opening 142, to define an internally-threaded cylindrical female portion 172 that functions as a female fastener or fitting. In basin 104, the lowermost terminus of basin 104 (at flange 160) includes a set of external threads generally indicated at 180 to define an externally-threaded cylindrical male portion 182 that functions as a male fastener or fitting. During assembly, the externally-threaded male portion 182 formed at the lower end of basin 104 is inserted and subsequently screwed into the internally-threaded female portion 172 formed at the upper end of base 102. This threaded connection positions basin 104 into a selectively removable mounting or support relationship with base 102. This alternate arrangement also offers fluid isolation between the basin reservoir and the ballast-receiving interior space 130 of base 102. The externally-threaded male portion 182 disposed at the bottom end of basin 104 (at flange 160) functions as a sealing cap over the ballast-receiving interior space 130, once the male portion 182 is threaded into the internally-threaded female portion 172 formed at the upper end of base 102 to mount basin 104 onto base 102.

Referring again to FIGS. 1 and 2, the assembled relationship between base 102 and basin 104 features a removable connection facilitated by a pair of male and female fasteners joined together by a threading engagement. In this way, the components of bird bath 100 can be considered a kit that requires no tools to assemble or disassemble. The action required to assemble and disassemble bird bath 100 simply involves a relative turning movement between the parts, in order to screw or unscrew basin 104 relative to base 102 as appropriate. Moreover, the threading engagement between base 102 and basin 104 is accomplished with a set of fastener structures that are integral with the base 102 and basin 104. For example, in FIG. 4, base 102 is adapted to provide a male fastener formation (152) and basin 104 is adapted to provide a complementary and mateable female fastener formation (164), while in FIG. 4A the arrangement is switched; namely, base 102 is adapted to provide a female fastener formation (172) and basin 104 is adapted to provide a complementary and mateable male fastener formation (182).

Figure 5:
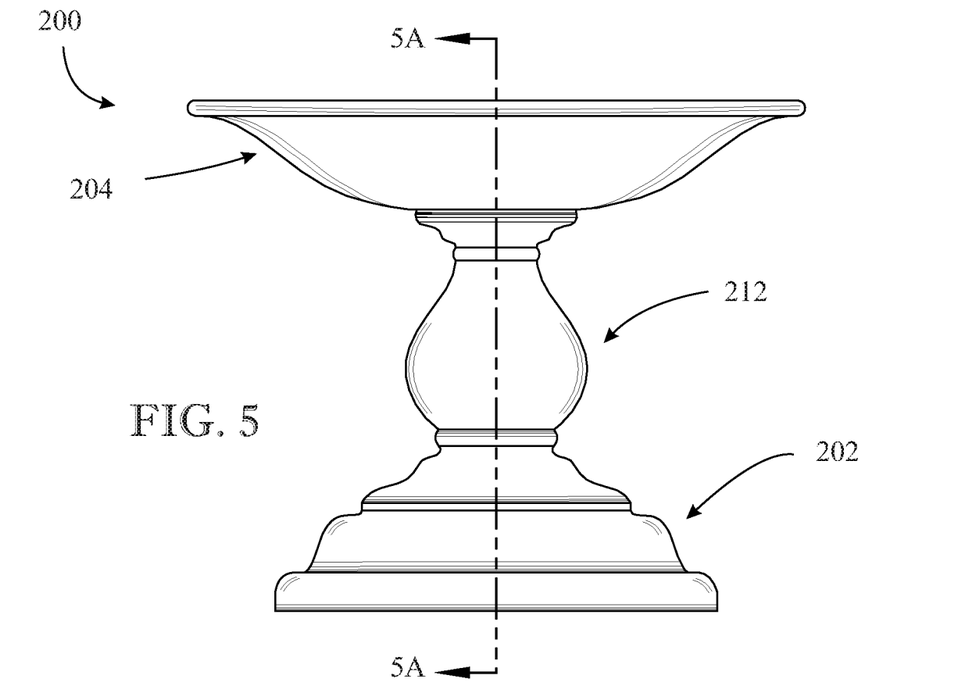
FIG. 5 presents a front elevation view of an assembled bird bath, according to a second implementation of the present invention.
Figure 5A:
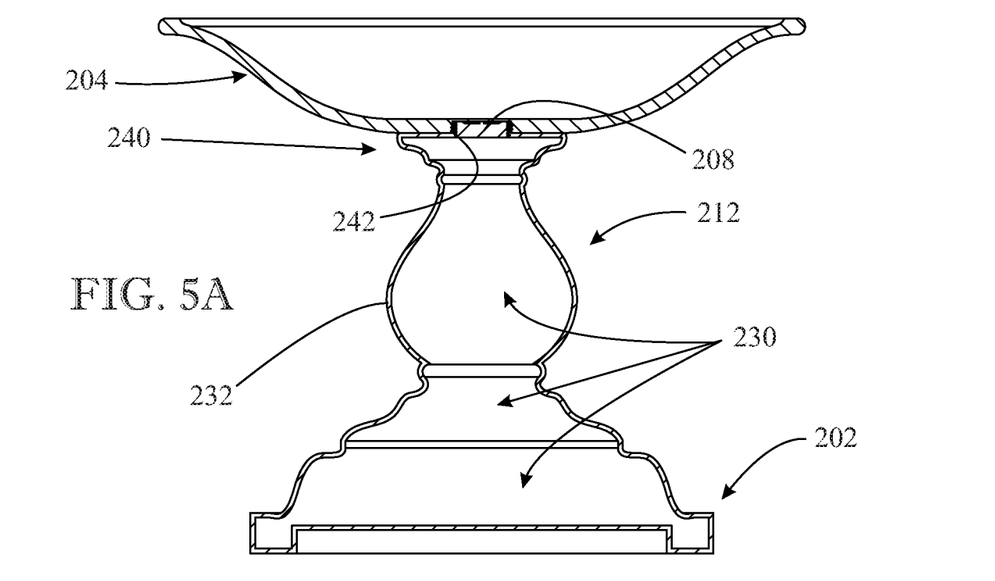
FIG. 5A presents a cross-sectional view taken along section line 5A-5A of FIG. 5, illustrating a threaded connection to removably attach the basin to the base and a removable plug to isolate the fluid receptacle space of the basin from the ballast-receiving interior space of the base.
Figure 6:
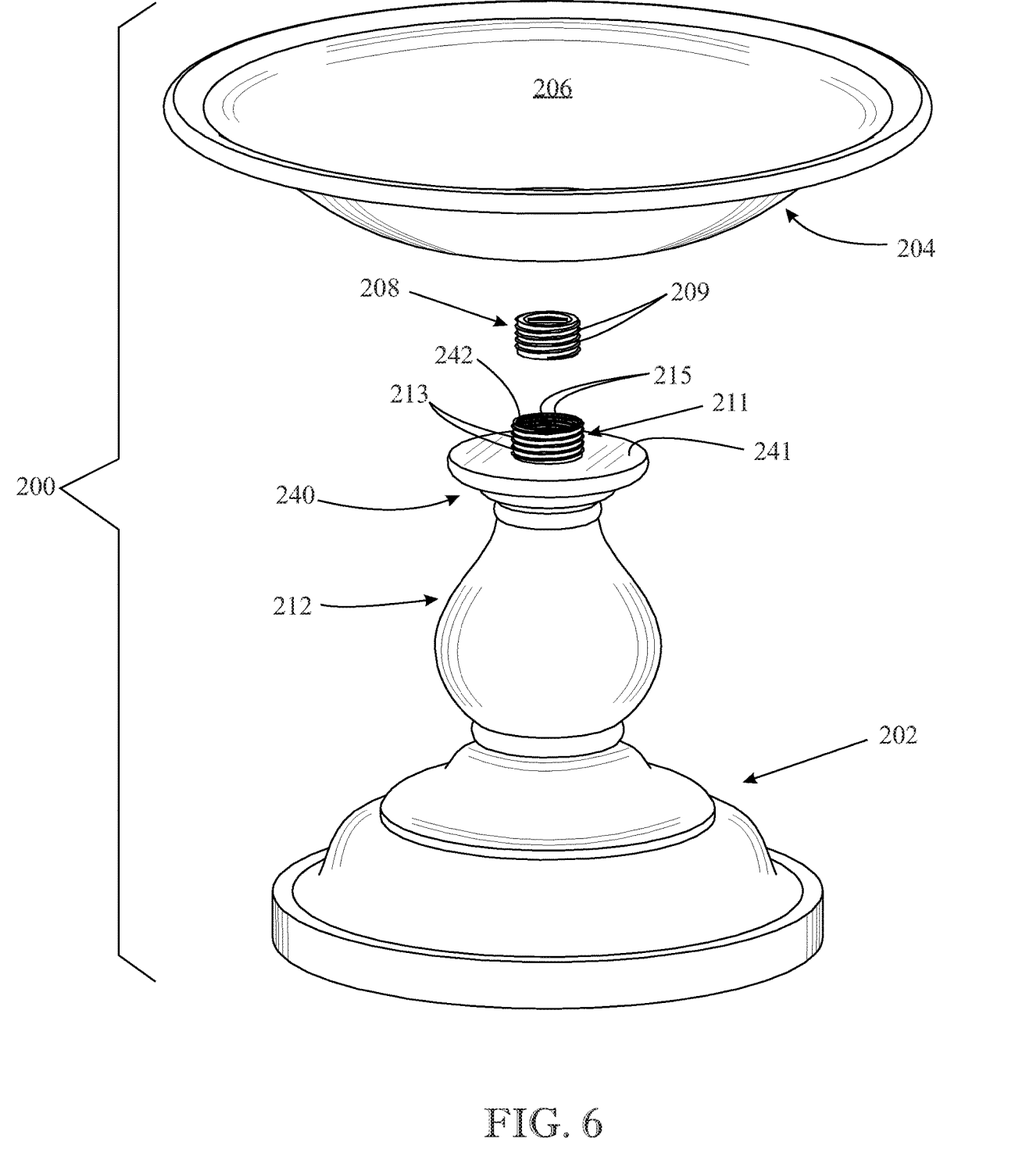
FIG. 6 presents a top front exploded perspective view of the bird bath originally introduced in FIG. 5, illustrating the relationship of the threaded removable plug to a double threaded sleeve projecting from the upper end of the base and which receives the plug.
Figure 7:
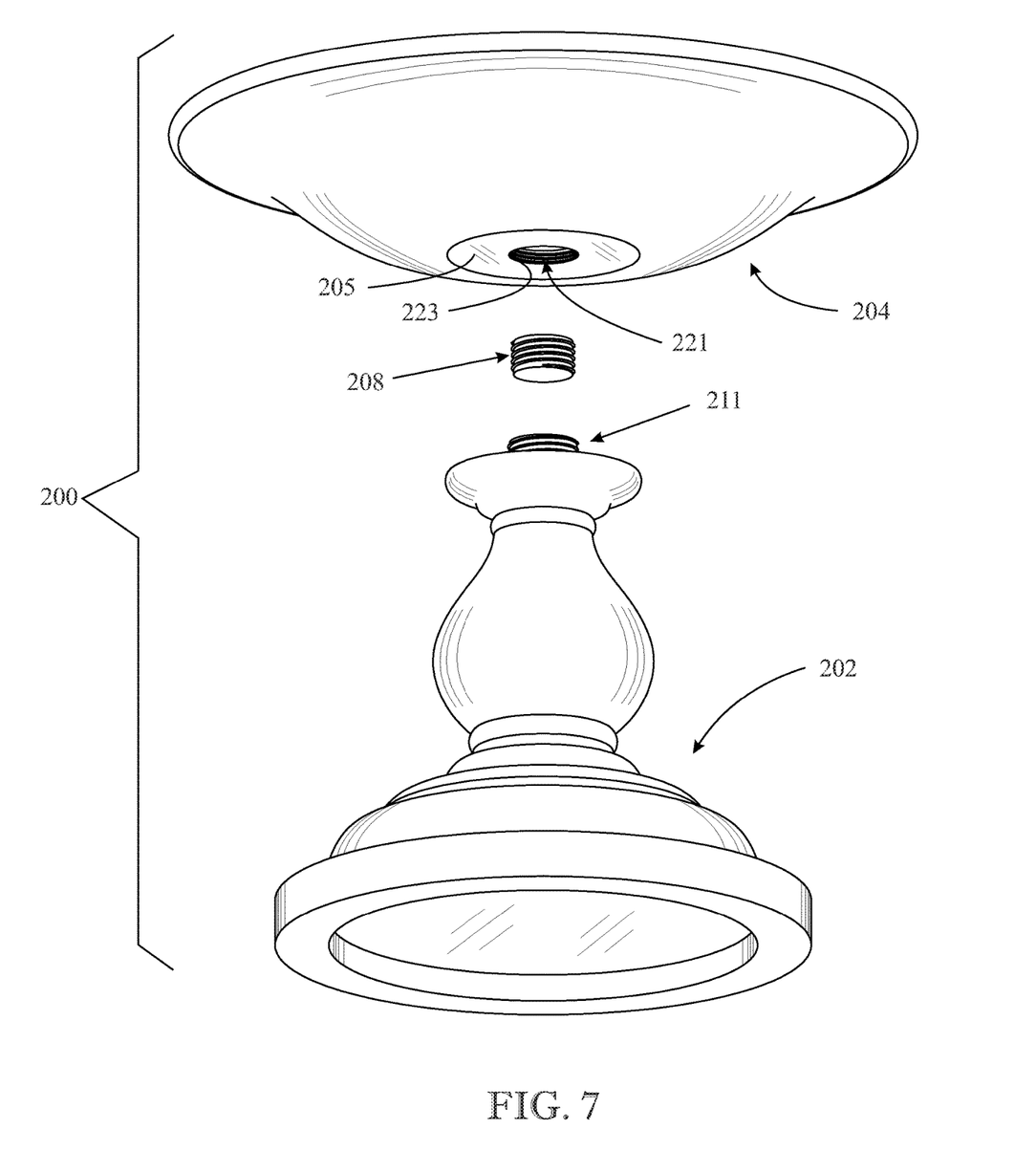
FIG. 7 presents a bottom front exploded perspective view of the bird bath originally introduced in FIG. 5 and further shown in FIG. 6, illustrating a threaded female aperture provided in the bottom of the basin to receive the threaded male sleeve projecting from the upper end of the base to enable selectively-removable mounting of the basin to the base.

Referring now generally to accompanying FIGS. 5-7, a bird bath is generally shown at 200, according to a second embodiment of the present invention. The bird bath 200 includes, in combination, a base shown generally at 202, a basin shown generally at 204, and a removable plug shown generally at 208. As best depicted in FIGS. 6 and 7, the bird bath 200 is considered an assembled three-piece construction, taking into account that basin 204 is removably mounted to base 202 and a removable plug 208 in incorporated into bird bath 200. The base 202 forms the lower part of bird bath 200, while basin 204 forms the upper removable part of bird bath 200. Similar parts and features between the first embodiment (FIGS. 1-4) and the second embodiment (FIGS. 5-7) are designated with similar reference numerals, except that the leading digit of '1' for reference numerals in connection with FIGS. 1-4 is replaced by a leading digit of '2' for the counterpart reference numerals in connection with FIGS. 5-7.

Referring to FIG. 5A, base 202 has a hollow interior space generally shown at 230 that functions as a compartment to receive ballast material such as water. The ballast-receiving interior space 230 of base 202 can be designed in any suitable manner. For example, the entirety of base 202 can be hollowed out, making the whole interior available to receive ballast material. In such a construction, the ballast-receiving interior space 230 of base 202 would be circumscribed by the entire outer peripheral surface 232 of base 102 (FIG. 5A). Alternatively, a portion or section of the interior of base 202 can be hollowed out.

For purposes of accessing the ballast-receiving interior space 230, the upper end 240 of base 202 (proximal neck 212) is formed at its uppermost terminus with an orifice or open-ended mouth section shown generally at 242 (FIG. 5A). The mouth section defines an aperture or fluid port that is arranged in communication with the ballast-receiving interior space 230. The mouth section 242 enables access to the ballast-receiving interior space 230 of base 202. In this manner, mouth section 242 functions as an inlet port through which the interior space 230 of base 202 can be filled with ballast material (such as by admitting water), and functions as an outlet port through which the ballast material held in base 202 can be removed or discharged (i.e. drained out) in order to empty base 202 of its ballast contents.

The basin 204 is removably mounted to base 202. In particular, base 202 and basin 204 are joined together using a selectively adjustable threaded connection between a pair of male-female parts. As discussed further, basin 204 is configured with a threaded female fitting or fastener, while base 202 is configured with a complementary, mateable male fitting or fastener. Referring to FIG. 6, the upper end 240 of base 202 includes a flat or planar surface 241 that functions as a mounting surface to seatingly receive, during assembly, a corresponding and opposing flat surface 205 formed at the lowermost portion of basin 204 (FIG. 7). The mouth section 242 is formed in flat surface 241. Base 202 includes a male connection member or cylindrical projection sleeve 211 having a set of external threads 213 and a set of internal threads 215. The sleeve 211 is suitably positioned over the mouth section 242 formed in flat surface 241 so that the axial hollow or bore defined by sleeve 211 is aligned over mouth section 242. Sleeve 211 projects or extends axially from planar surface or seat 241 formed at the uppermost terminus of upper end 240 of base 202. Referring to FIG. 7, an aperture, orifice, or hole 221 is formed in flat surface 205 defined at the lowermost portion of basin 204. The hole 221 includes a set of internal threads 223 that are complementary and mateable with the set of external threads 213 of sleeve 211 projecting from base 202. The hole 221 of basin 204 is aligned with the bore of projection sleeve 211 of base 202. The projection sleeve 211 of base 202 forms a male fastener part at its external threads 213, while hole 221 of basin 204 forms a female fastener part at its internal threads 223 that is complementary and mateable with the external threads 213 of projection sleeve 211. In this manner, a male-female threading engagement is possible between projection sleeve 211 at its external threads 213 and aperture 221, at its internal threads 223.

Referring still to FIGS. 6 and 7, the removable plug 208 preferably has a solid core construction and includes a set of external threads 209 that are complementary and mateable with the internal threads 215 of sleeve 211 projecting from the upper end 240 of base 202. The plug 208 forms a male fastener part at its external threads 209, while projection sleeve 211 forms a female fastener part at its internal threads 215. In this manner, a male-female threading engagement is possible between plug 208 at its external threads 209 and projection sleeve 211 at its internal threads 215.

Referring again to FIGS. 5-7, and particularly FIG. 5A, during assembly the basin 204 is mounted to base 202 by screwing basin 204 onto base 202. In particular, aperture 221 provided in basin 204 is aligned over, and maneuvered onto, projection sleeve 211 extending from surface 241 formed at the upper end 240 of base 202. In a subsequent turning operation involving the rotation of basin 204 relative to base 202, external threads 213 of sleeve 211 incorporated into base 202 threadingly engage internal threads 223 of aperture 221 in basin 204. In this manner, basin 204 is screwed onto base 202, such that seating surface 241 at the upper end 240 of base 202 is disposed in flush contact with surface 205 formed at the underside of basin 204. In this assembled configuration, bird bath 200 includes a continuous fluid pathway between the fluid receptacle space or reservoir 206 defined in basin 204 and the ballast-receiving hollow space 230 defined in base 202. This fluid pathway has an intermediate channel defined by the internal bore of projection sleeve 211 extending from base 202 and now threaded into basin 204. At this point, base 202 can be filled with ballast material, such as water, by pouring the water into basin reservoir 206, which then drains down into ballast-receiving space 230 of base 202 through sleeve 211.

Once the ballast-receiving space 230 has been adequately filled with ballast material, the as-filled ballast-receiving space 230 of base 202 can be isolated from basin reservoir 206 by threadedly inserting plug 208 into projection sleeve 211. Once basin 204 is securely mounted to base 202, the interior bore space of sleeve 211 is still accessible at the bottom of basin reservoir 206, enabling plug 208 to be threadingly inserted into the bore of projection sleeve 211 where its internal threads 215 are located. In particular, plug 208 can be screwed into projection sleeve 211 via a threading engagement between the external threads 209 of plug 208 and the internal threads 215 of sleeve 211. As installed, plug 208 functions as a fluid barrier between the overlying basin reservoir 206 and the underlying ballast-receiving space 230. The basin reservoir 206 can now be filled separately with water, without any drainage into the ballast-receiving space 230 of basin 202, thereby preventing a mixture between the two. In an alternate filling operation, the ballast-receiving space 230 of base 202 can first be filled with fluid in a standalone manner prior to mounting basin 204 to base 202. Next, plug 208 can be installed in the filled base 202, and then basin 204 screwed onto base 202 as before.

It is beneficial to seal off the basin reservoir 206 from the ballast-receiving space 230 of base 202. For example, the fluid isolation facilitated by plug 208 enables the water contained in the ballast-receiving space 230 to be treated with a chemical additive, such as a tablet, powder, or liquid, in order to prevent the growth of bacteria. Due to the sealing function of plug 208, there is no possibility that such chemical treatment will become mixed with the drinking water contained in basin reservoir 206.

Figures 8, 8A:
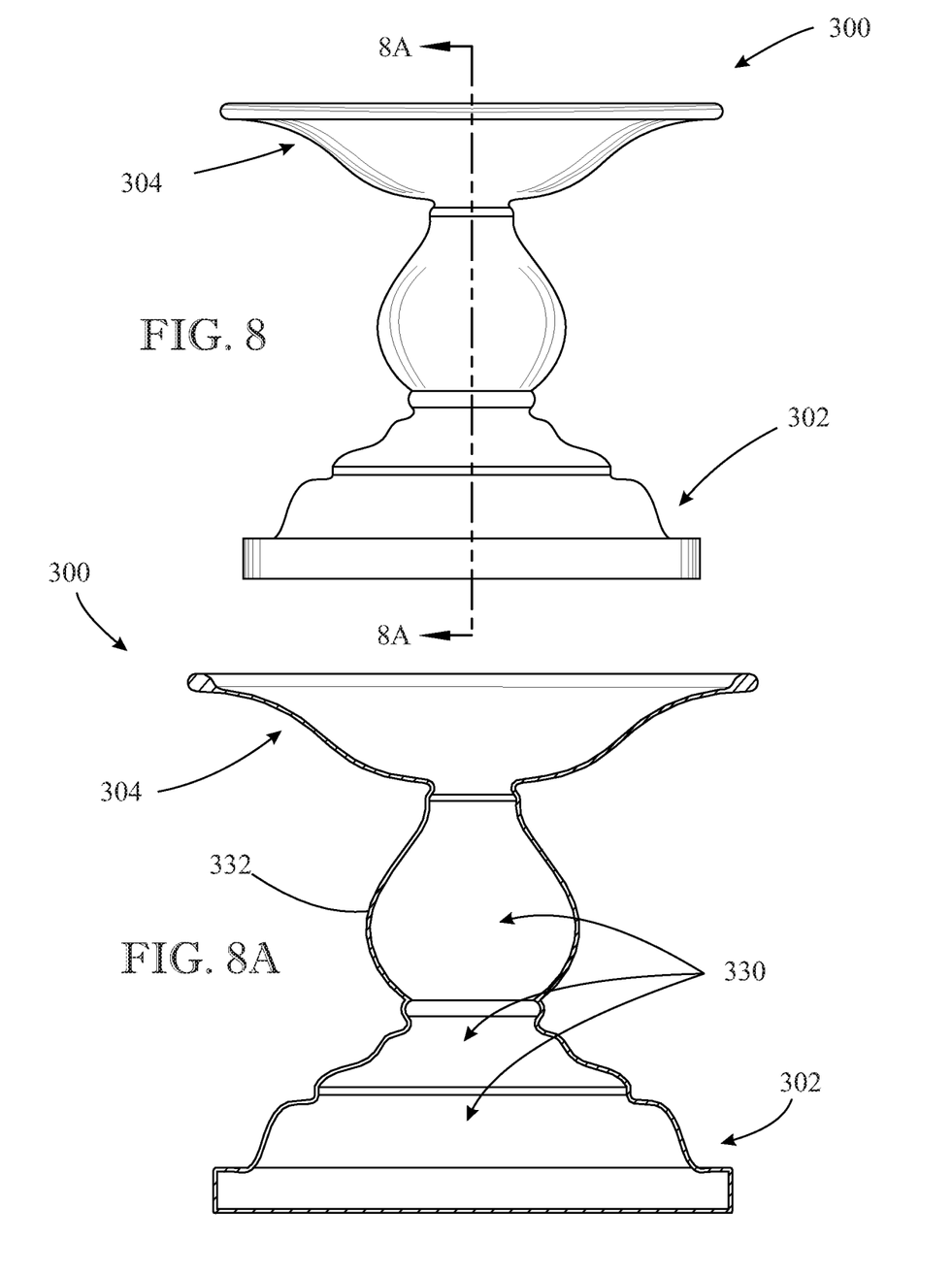
FIG. 8 presents a front elevation view of a unitary, one-piece bird bath, according to a third implementation of the present invention.
FIG. 8A presents a cross-sectional view taken along section line 8A-8A of FIG. 8, illustrating the fluid communication between the fluid receptacle space of the basin and the ballast-receiving interior space of the base.
Figure 9:
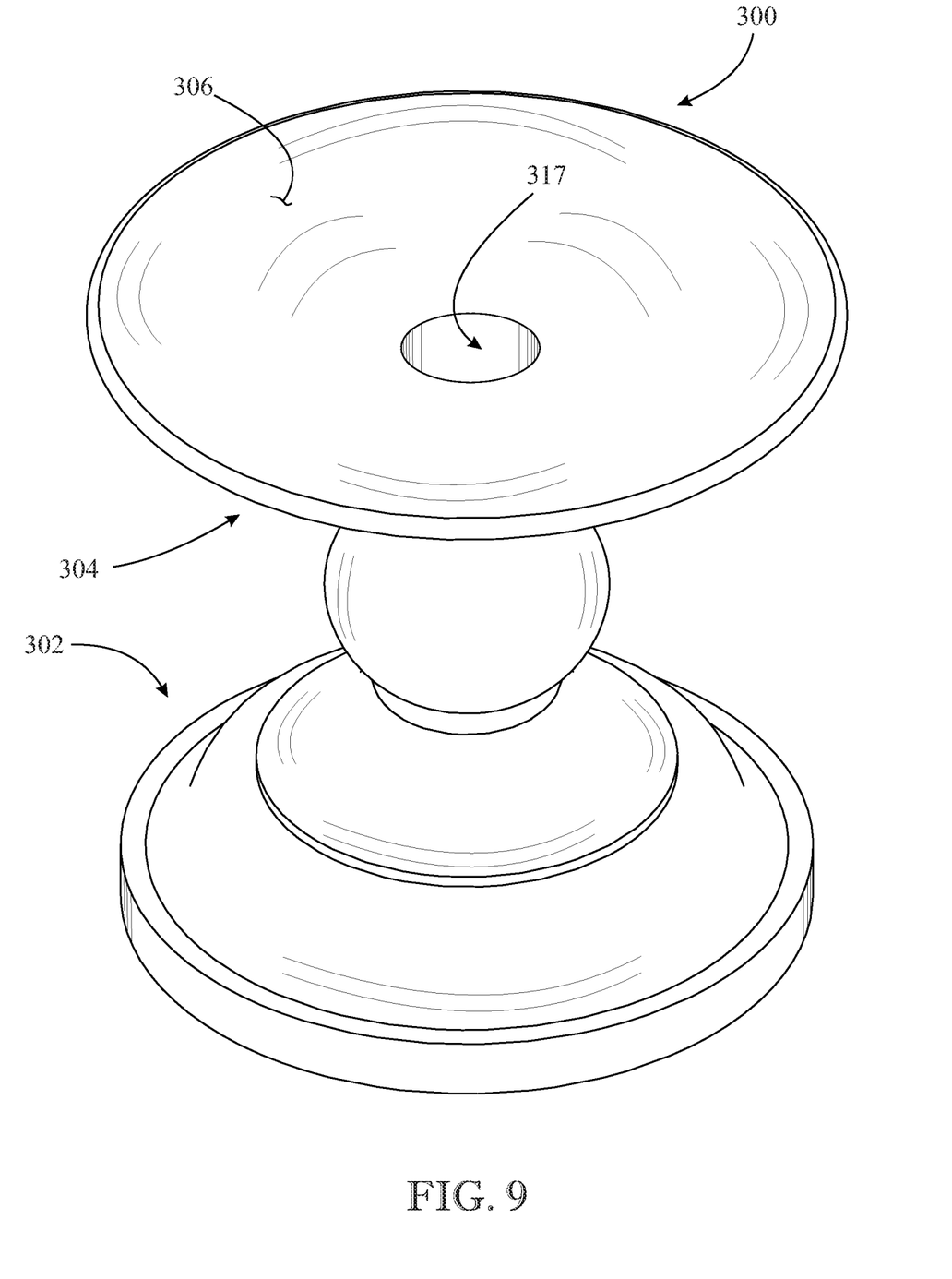
FIG. 9 presents a top front perspective view of the bird bath originally introduced in FIG. 8, illustrating the fluid port that connects the fluid receptacle space of the basin and the ballast-receiving interior space of the base.
Figure 10:
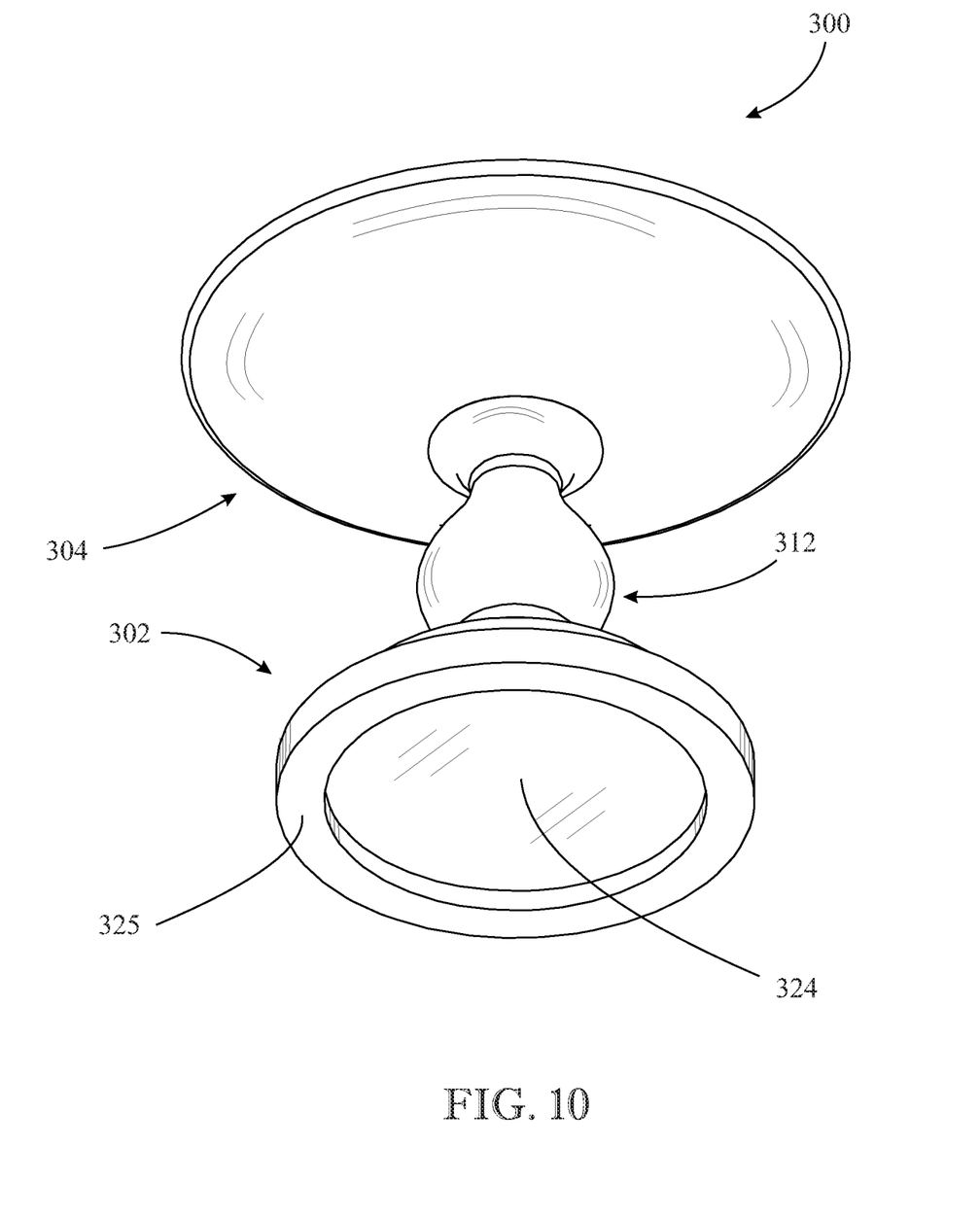
FIG. 10 presents a bottom front perspective view of the bird bath originally introduced in FIG. 8.

Referring now generally to accompanying FIGS. 8-10, a bird bath is generally shown at 300, according to a third embodiment of the present invention. The bird bath 300 includes, in combination, a base shown generally at 302 and a basin shown generally at 304. The base 302 and basin 304 cooperatively form a unitary, one-piece, integral structure such as a molded construction. The bird bath 300 is considered a one-piece construction, due to the integral formation of base 302 and basin 304. The base 302 forms the lower part of bird bath 300, while basin 304 forms the upper part of bird bath 300. Similar parts and features between the first and second embodiments (FIGS. 1-4 and FIGS. 5-7, respectively) and the third embodiment (FIGS. 8-10) are designated with similar reference numerals, except that the counterpart reference numerals in FIGS. 8-10 have a leading digit of '3.' For example, cavity 224 formed in the bottom end of base 302 and defining annular peripheral wall 325 is identical to corresponding cavity 124 formed in the bottom end of base 102 and defining annular peripheral wall 125 in FIGS. 1-4.

Referring to FIG. 8A, base 302 has a hollow interior space generally shown at 330 that functions as a compartment to receive ballast material such as water. The ballast-receiving interior space 330 of base 302 can be designed in any suitable manner. For example, the entirety of base 302 can be hollowed out, making the whole interior available to receive ballast material. In such a construction, the ballast-receiving interior space 330 of base 302 would be circumscribed by the entire outer peripheral surface 332 of base 302. Alternatively, a portion or section of the interior of base 302 can be hollowed out. The basin 304 defines a fluid receptacle space 306 (FIG. 9).

Bird bath 300 further includes an opening 317 (FIG. 9) formed at the lower portion or bottom of basin 304. The opening 317 defines a fluid port that establishes fluid communication between the fluid receptacle space 306 of basin 304 and the ballast-receiving interior space 330 of base 302. In this manner, the ballast-receiving interior space 330 can be filled by pouring water, for example, into fluid receptacle space 306 of basin 304, which then drains through opening 317 into the ballast-receiving interior space 330.

In an alternate configuration, bird bath 300 can be modified to include a selectively removable plug (not shown) similar to the one deployed in FIGS. 5-7 (i.e. removable plug 208). For this purpose, a set of internal threads (not shown) would be provided in opening 317, similar in placement to the threads 223 provided at the bottom of basin 204 in opening 221 (FIGS. 5-7). A plug fitted with external threads could then be inserted into such a threaded opening 317 via a threading engagement. In this manner, the fluid receptacle space 306 defined in the basin 304 could be isolated from the ballast-receiving interior space 330 of base 302.

In all of the exemplary embodiments disclosed herein, the water-fillable feature of the bird bath base enables ballast to be added to the bird bath unit, helping it to remain anchored and stable when placed in its working position on a resting surface. The bird bath designs support an adjustable and variable ballasting feature, since the user can selectively fill and drain water from the ballast-receiving interior space of the base according to a desired amount of ballast, such as a particular volume or weight of water. The amount of ballast is varied or adjusted by simply adding or removing ballast from the base. Moreover, the embodiments provide a means for isolating the basin reservoir from the ballast-receiving interior space of the base. In the second (FIGS. 5-7) and third (FIGS. 8-10) embodiments, a removable plug can function as a fluid barrier between these two fluid spaces. In the first embodiment (FIGS. 1-4), the male-female threaded joint between the base and removable basin is designed with a built-in structural feature to offer such fluid isolation.

The construction, structure, and design of the first (FIGS. 1-4) and second (FIGS. 5-7) embodiments provide a selectively attachable basin, which enables the bulk of the weight to be temporarily removed. Additionally, this removable feature enables a lightweight, modular, and portable construction that is much easier to package, ship, transport, and set-up/install by a single individual. A variety of materials could be used to construct the bird baths disclosed herein, though it is preferred that the product is a molded polymer. Molding facilitates the manufacturing of an exterior surface having a very realistic appearance (e.g., natural stone, metal, cement, etc.).

Since many modifications, variations, and changes in detail can be made to describe preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A bird bath, comprising:
   a base having a ballast-receiving interior space and a mouth defined at an upper portion of said base, the mouth disposed in fluid communication with the ballast-receiving base interior space;
   a basin removably mounted to the base and defining a fluid reservoir isolated from the ballast-receiving interior space of the base, said basin including one of an internally-threaded female basin portion and an externally-threaded male basin portion defined at a lower portion of said basin, said base including the other one of said internally-threaded female portion and said externally-threaded male portion defining said mouth at said upper portion of said base; and
   a joint defined by a selectively adjustable threading engagement between said internally-threaded female portion and said externally-threaded male portion.

2. The bird bath as recited in claim 1, wherein the basin further comprises:
   a flange depending downwardly from an underside of the basin in opposition to the base, the flange defining an internally-threaded cylindrical opening.

3. The bird bath as recited in claim 2, wherein the base further comprises:
   an externally-threaded cylindrical upper end defining said mouth, the cylindrical upper end sized, shaped, and otherwise configured for adjustable threading engagement with the internally-threaded cylindrical flange opening of the basin.

4. A bird bath, comprising:
   a base having a ballast-receiving interior space, the base further having an opening defined at an upper end of the base and disposed in communication with the ballast-receiving interior space;
   a male fastener sleeve disposed at the upper end of the base and having an interior bore space disposed in communication with the opening of the base, the male fastener sleeve including external threads formed at an exterior surface thereof and internal threads formed at an interior surface thereof;
   a basin removably mounted to the base and defining a fluid receptacle space;
   an aperture formed in a lower portion of the basin and disposed in communication with the fluid receptacle space of the basin, the basin aperture including internal threads;
   a joint defined by an adjustable threading engagement between the male fastener sleeve at the external threads thereof and the basin aperture at the internal threads thereof;
   a selectively removable plug having external threads; and
   a sealing formation defined by an adjustable threading engagement between the plug at the external threads thereof and the male fastener sleeve at the internal threads thereof.

5. The bird bath as recited in claim 4, further comprising:
   a seat defined by a generally planar surface formed at the upper end of the base and having the opening of the base formed therein; and
   a mounting section defined by a generally planar surface formed at the lower portion of the basin and having the basin aperture formed therein, wherein the mounting section is disposed in facing opposition to the base seat, wherein, the male fastener sleeve projects from the base seat and is located at least partly over the base opening.

6. The bird bath as recited in claim 4, further comprising:
   a fluid pathway defined between the fluid receptacle space of the basin and the ballast-receiving interior space of the base upon removal of the plug, the fluid pathway passing intermediately through the basin aperture, the male fastener sleeve, and the base opening.

7. The bird bath as recited in claim 4, wherein the sealing formation is configured to promote isolation between the fluid receptacle space of the basin and the ballast-receiving interior space of the base.

8. The bird bath as recited in claim 4, wherein the male fastener sleeve extends axially towards the basin from the upper end of the base.

9. A bird bath, comprising:
a unitary bird bath structure including:
 a base having a ballast-receiving interior space;
 a basin integral with the base and defining a fluid receptacle space; and
a fluid port connecting the fluid receptacle space of the basin and the ballast-receiving interior space of the base, the fluid port defined by an internally-threaded aperture provided at a lower portion of the basin.

10. The bird bath as recited in claim 9, further comprising:
a selectively removable plug having external threads; and
a sealing formation defined by an adjustable threading engagement between the plug at the external threads thereof and the aperture at the internal threads thereof.

11. The bird bath as recited in claim 10, wherein the sealing formation is configured to promote isolation between the fluid receptacle space of the basin and the ballast-receiving interior space of the base.

12. The bird bath as recited in claim 9, further comprising:
an aperture defining the fluid port and formed at a lower portion of the basin;
a set of internal threads defined in the aperture;
a selectively removable plug having external threads; and
a sealing formation defined by an adjustable threading engagement between the plug at the external threads thereof and the aperture at the internal threads thereof.

13. The bird bath as recited in claim 12, wherein the sealing formation is configured to promote isolation between the fluid receptacle space of the basin and the ballast-receiving interior space of the base.

\* \* \* \* \*